Aug. 5, 1958 C. M. MacCHESNEY 2,846,516

MAGNETIC RECORDING AND REPRODUCING APPARATUS

Filed Aug. 10, 1953 7 Sheets-Sheet 1

INVENTOR.
Chester M. MacChesney
BY
Smith, Olsen, Baird & Gulbrandsen
Attys.

Aug. 5, 1958 C. M. MacCHESNEY 2,846,516

MAGNETIC RECORDING AND REPRODUCING APPARATUS

Filed Aug. 10, 1953 7 Sheets-Sheet 2

INVENTOR.
Chester M MacChesney
BY
Smith, Olsen, Baird & Gulbrandsen
Attys.

MAGNETIC RECORDING AND REPRODUCING APPARATUS

Filed Aug. 10, 1953 7 Sheets-Sheet 3

INVENTOR.
Chester M. MacChesney
BY Smith, Olsen, Baird & Gulbrandsen
Attys.

Aug. 5, 1958 C. M. MacCHESNEY 2,846,516

MAGNETIC RECORDING AND REPRODUCING APPARATUS

Filed Aug. 10, 1953 7 Sheets-Sheet 4

INVENTOR.
Chester M. MacChesney
BY
Smith, Olsen, Baird & Gulbrandsen
Attys.

Aug. 5, 1958 C. M. MacCHESNEY 2,846,516

MAGNETIC RECORDING AND REPRODUCING APPARATUS

Filed Aug. 10, 1953 7 Sheets-Sheet 5

INVENTOR.
Chester M. MacChesney
BY
Smith, Olsen, Baird & Gulbrandsen
Attys.

MAGNETIC RECORDING AND REPRODUCING APPARATUS

Filed Aug. 10, 1953 7 Sheets-Sheet 6

INVENTOR.
Chester M. MacChesney
BY
Smith, Olsen, Baird & Gulbrandsen
Attys.

INVENTOR.
Chester M. MacChesney
BY
Smith, Olsen, Baird & Gulbrandsen
Attys.

United States Patent Office 2,846,516

Patented Aug. 5, 1958

2,846,516

MAGNETIC RECORDING AND REPRODUCING APPARATUS

Chester M. MacChesney, Chicago, Ill., assignor to Ellamac Incorporated, Chicago, Ill., a corporation of Illinois Application August 10, 1953, Serial No. 373,235

32 Claims. (Cl. 179—100.2)

The present invention relates to magnetic recording and reproducing apparatus employing magnetic record cards.

It is a general object of the present invention to provide magnetic recording and reproducing apparatus employing magnetic record cards that may be readily and conveniently stored, when not in use, in a conventional filing cabinet, or the like.

Another object of the invention is to provide apparatus of the character noted, wherein the magnetic recording of a continuous electric signal in an electric circuit upon a plurality of magnetic media or lines carried by the record card is uninterrupted, and wherein the reproduction of an electric signal in the electric circuit from magnetic recordings upon a plurality of the magnetic media or lines carried by the record card is continuous.

Another object of the invention is to provide magnetic recording and reproducing apparatus of the character noted, whereby intelligence may be readily translated continuously in either direction between an electric circuit and a magnetic record card and involving sequentially a plurality of magnetic media or lines carried by the record card.

Another object of the invention is to provide recording and reproducing apparatus involving a record card of substantially flat rectangular form and standard dimensions accommodating ready filing of the record card with other related papers, or the like.

A further object of the invention is to provide apparatus for translating intelligence between an electric circuit and a magnetic record card, that involves odd and even electromagnetic transducers, and a record card carrying odd and even groups of adjacent longitudinally extending and laterally spaced-apart magnetic media, wherein the odd and even transducers are alternately moved longitudinally along and in cooperating relation with the magnetic media in the respective odd and even groups, and the odd and even transducers are alternately indexed laterally with respect to the individual magnetic media in the corresponding odd and even groups and intermediate the alternate longitudinal movements thereof, and the odd and even transducers are alternately coupled to the associated electric circuit, whereby the translation of the intelligence between the electric circuit and a plurality of the magnetic media is continuous and involves sequentially the magnetic media in the odd and even groups.

A further object of the invention is to provide combination magnetic recording and reproducing apparatus of the character noted, that may be readily converted between respective recording and reproducing operations by the manipulation of a single control switch.

A further object of the invention is to provide combination magnetic recording and reproducing apparatus of the character noted, that may be readily preset for recording or for reproducing beginning at any preselected magnetic medium or line carried by the record card, and that may be readily preset for recording or for reproducing ending at any preselected magnetic medium or line carried by the record card.

A further object of the invention is to provide combination magnetic recording and reproducing apparatus of the character noted, that may be readily preset either for a recording operation or for a reproducing operation and also involving any preset section of the record card.

A further object of the invention is to provide combination magnetic recording and reproducing apparatus of the character noted, that incorporates improved mechanism for correlating the alternative movements of the respective odd and even transducers so that one of the transducers is always moving in a recording direction and at a recording speed with respect to a corresponding one of the magnetic media or lines upon the record card, and improved mechanism for correlating the indexing of the transducers intermediate the recording movements thereof so that the indexing of the transducers in no way interferes with the recording movements thereof.

A still further object of the invention is to provide in combination magnetic recording and reproducing apparatus of the character noted, an improved electric control system therefor that brings about simple and ready selective operations thereof.

Further features of the invention pertain to the particular arrangement of the elements of the apparatus, whereby the above-outlined and additional operating features thereof are attained.

The invention, both as to its organization and principle of operation, together with further objects and advantages thereof, will best be understood by reference to the following specification taken in connection with the accompanying drawings, in which.

Figures 6, 7:
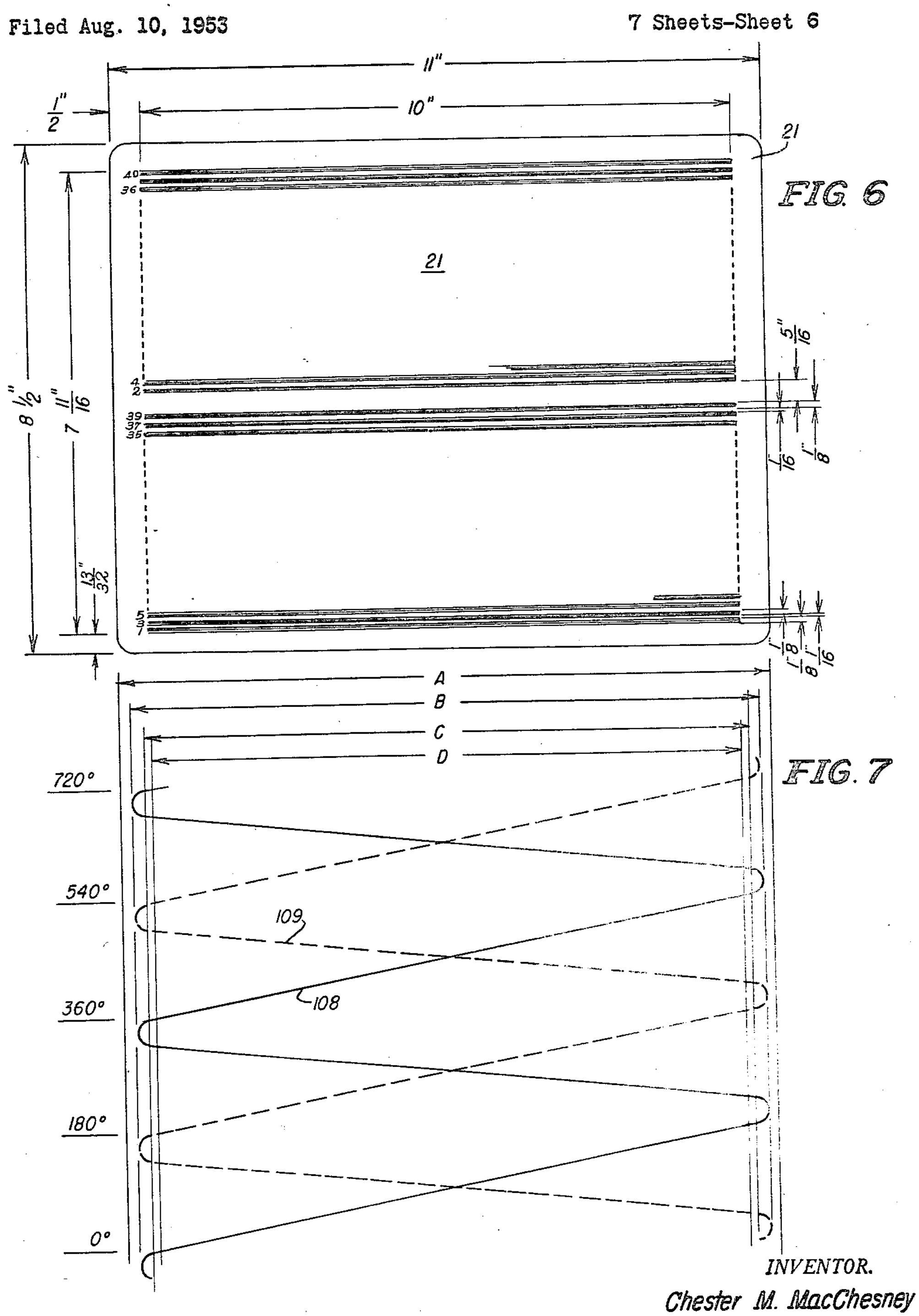
Fig. 6 is an enlarged face view of a magnetic record card that is employed in the apparatus shown in Figs. 1 to 5, inclusive.
Figure 8:
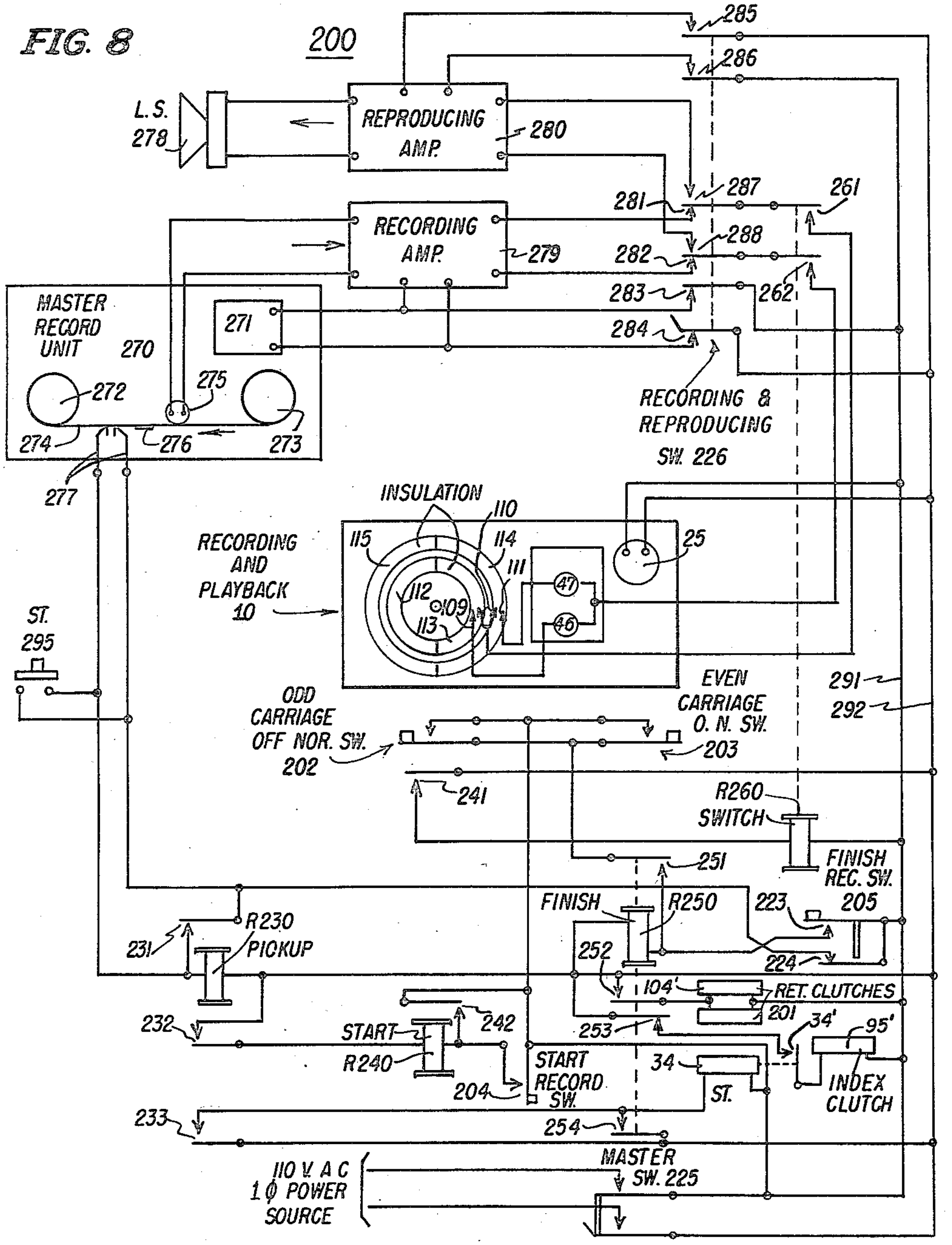

Fig. 7 is an enlarged diagrammatic illustration of the paths of movements of the odd and even transducers incorporated in the apparatus, and illustrating both the time sequence of the movements of the two transducers and the relationship between the movements of the two transducers and the structure of the record card, as shown in Fig. 6; and Fig. 8 is a diagram of the electric control circuit for the apparatus, also illustrating the cooperation between the apparatus and associated electrical equipment normally employed therewith.

Figure 1:
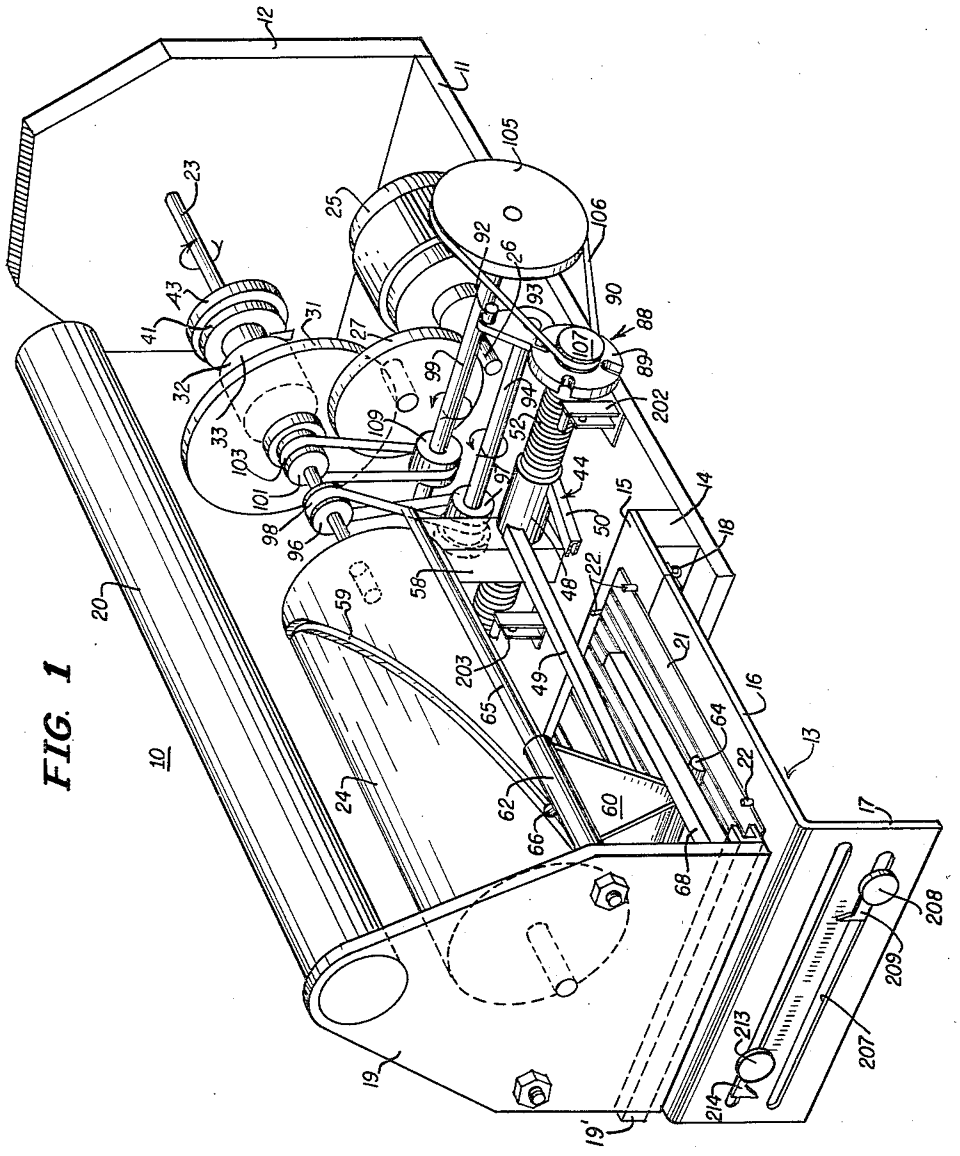
Figure 1 is a front perspective view, partly broken away, of magnetic recording and reproducing apparatus embodying the present invention.

Referring now to Fig. 1 of the drawings, there is illustrated combination magnetic recording and reproducing apparatus 10, embodying the features of the present invention; which apparatus 10 comprises a support, not shown, and certain supporting structure, including a longitudinally extending base plate 11 carrying at the rear end thereof an upstanding end plate 12, and carrying at the front end thereof a pivotally mounted shelf 13. More particularly, a laterally extending sill 14 is secured to the base 11 adjacent to the front end thereof and terminates in a substantially horizontally disposed platen section 15; and the shelf 13 comprises a platen section 16 and a downwardly turned front apron 17.

The rear end of the platen section 16 is secured to the front end of the platen section 15 by a suitable hinge 18; and the shelf 13 is movable between the work-position illustrated and a downwardly disposed rest-position, not illustrated. When the shelf 13 occupies its normal work-position illustrated, the platen section 16 comprises a continuation of the platen section 15 providing a composite platen 15—16 disposed substantially in the horizontal plane and projecting forwardly from the base plate 11.

Further the apparatus 10 comprises an upstanding front end plate 19 arranged in spaced-apart relation with respect to the rear end plate 12 and secured in place by a longitudinally extending bar 20 arranged therebetween, the front end plate 19 being disposed substantially flush with the apron 17, when the shelf 13 occupies its normal work-position illustrated, the lower end of the front end plate 19 being disposed above the platen section 16 to accommodate placement and removal upon the composite platen 15—16 of a magnetic record card 21. The normal supported position of the record card 21 is established by a plurality of guide pins 22, or the like, carried by the platen sections 15 and 16. Moreover, the normal supported position of the record card 21 upon the composite platen 15—16 may be further secured by clamps, or the like, not shown, or alternatively by a vacuum suction arrangement, not shown. In any case, the normal position of the record card 21 upon the composite platen 15—16 comprises a fixed and secure position so that the record card 21 is not moved or shifted in an undesirable manner incident to recording thereupon or reproduction therefrom, as explained more fully hereinafter.

Referring now to Fig. 6, the record card 21 is formed of flat sheet paper stock, or the like, and has a substantially rectangular configuration and is of standard dimensions so that it may be stored, when not in use, in a standard filing cabinet, or the like. For example, the substantially rectangular record card 21 may have a width of 11" and a height of 8½" and comprises odd and even groups of adjacent longitudinally extending and laterally spaced-apart elongated magnetic media. As illustrated, the odd magnetic media comprises twenty individual strips or lines disposed adjacent to the bottom of the record card 21; and the even magnetic media comprises twenty individual strips or lines disposed adjacent to the top of the record card 21. Specifically, the two groups of magnetic media may occupy an area upon the record card 21 that is 10" long by 7$^{11}/_{16}$" high, the two groups of magnetic media being separated from each other by a distance of $^{5}/_{16}$". In each group of magnetic media each individual magnetic medium may be 10" long and ⅛" wide and may be separated from the adjacent magnetic medium by a distance of $^{1}/_{16}$". Accordingly, the record card 21 may comprise end margins of ½" and top and bottom margins of $^{13}/_{32}$". The record card 21 may be formed of materials other than paper, such, for example, as the various plastic materials, including cellulose acetates, etc.; and the magnetic media may take any conventional form. While the magnetic media may consist of separate narrow magnetic tapes secured to the surface of the record card 21, it is normally more convenient to print or paint them upon the surface of the record card 21 utilizing commercially available paramagnetic printing or painting inks or supplies. For instance, each of the magnetic mediums may consist of a thin layer of paramagnetic material in powdered form bonded to the surface of the record card 21. Also it is preferable that the record card 21 have an appropriate thickness so as to render it reasonably stiff, yet suitably flexible for handling purposes.

Figure 2:
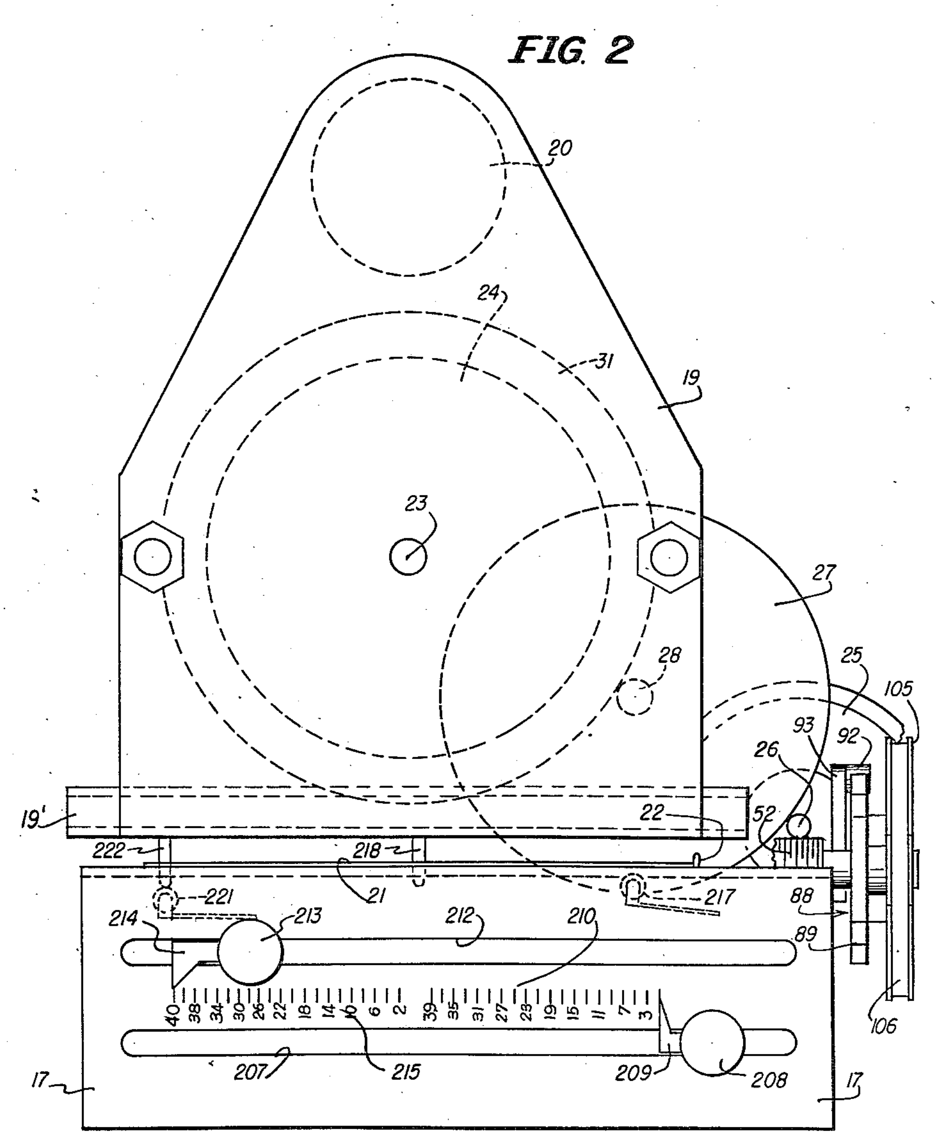
Fig. 2 is an enlarged front and elevational view, partly broken away, of the apparatus.
Figure 3:
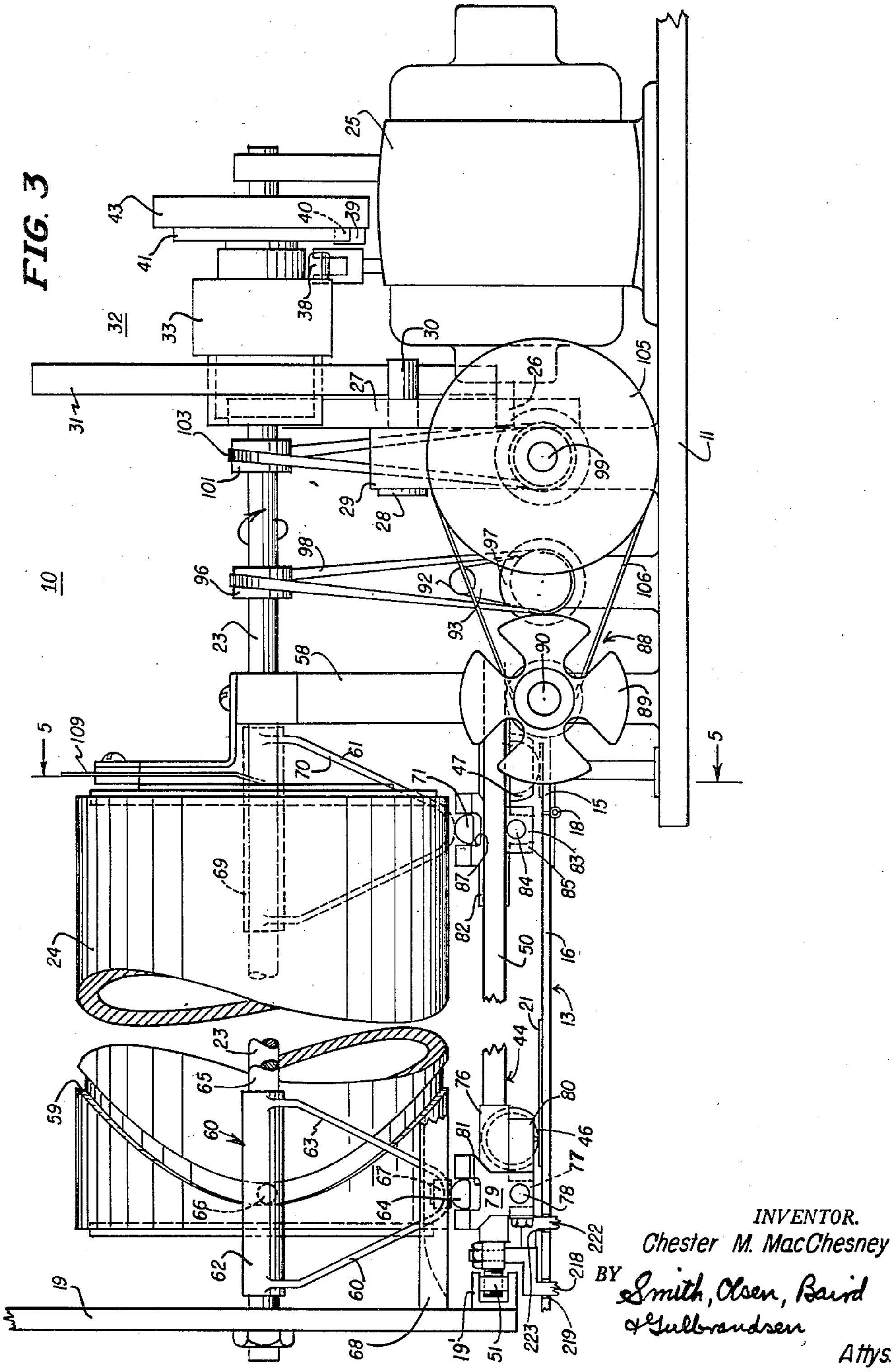
Fig. 3 is an enlarged longitudinal side elevational view, partly broken away, of the apparatus.
Figure 4:
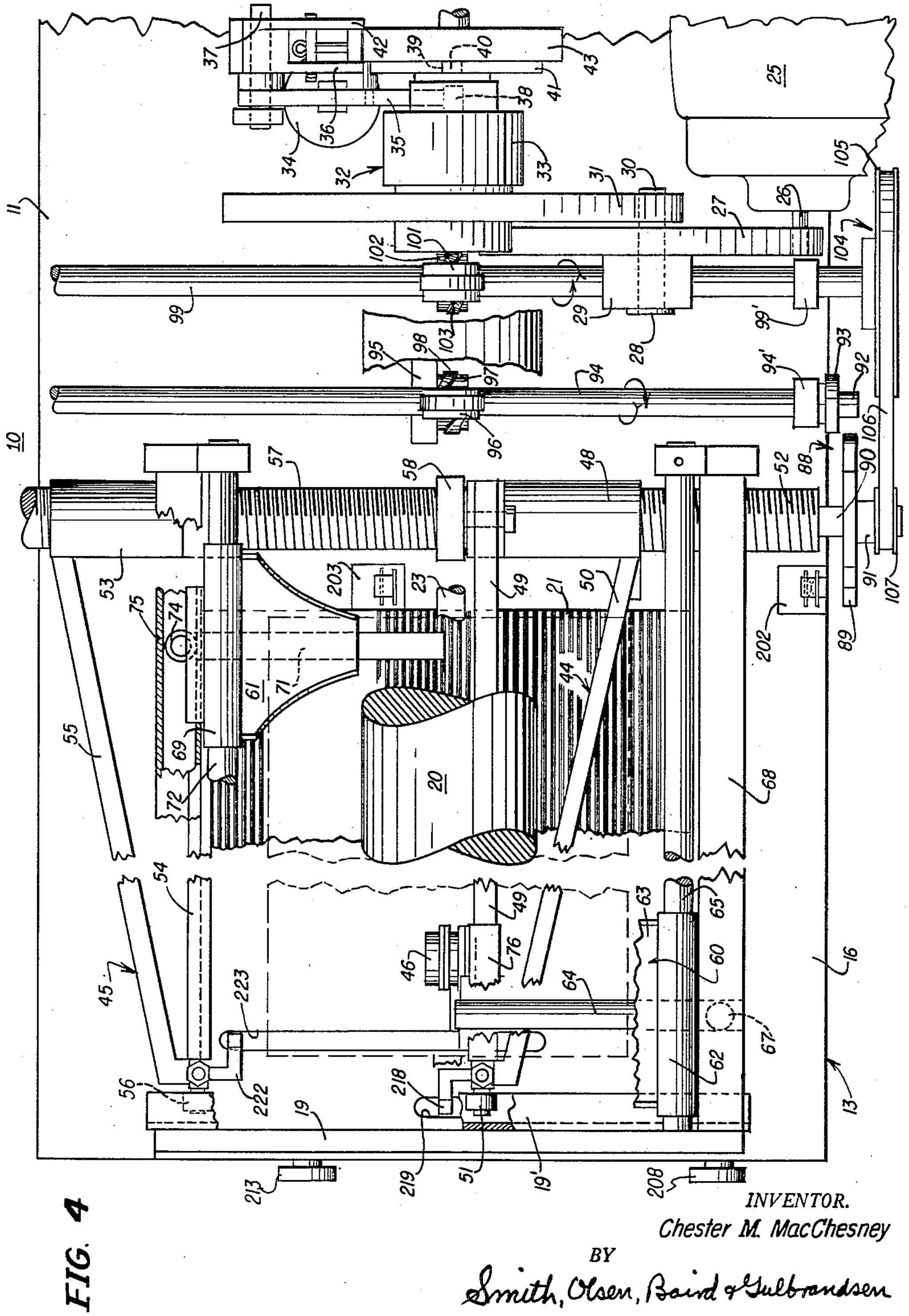
Fig. 4 is an enlarged plan view, partly broken away, of the apparatus.

Referring now to Figs. 1 to 5, inclusive, the apparatus 10 further comprises a longitudinally extending main shaft 23 suitably journaled adjacent to the ends thereof in the end plates 12 and 19 and carrying on the front end thereof a cylindrical cam 24 and driven from an electric drive motor 25 carried by the base plate 11. More particularly, as best shown in Figs. 3 and 4, the electric motor 25 is provided with a drive shaft terminating in a friction roll 26 that drives a friction wheel 27 carried by a pin 28 journaled in a stud 29, the pin 28 terminating in a friction roll 30 that drives a friction wheel 31 that is mounted upon the main shaft 23 and arranged selectively for clutched and declutched relationship with respect thereto. More specifically, the friction wheel 31 comprises a portion of a conventional Hilliard single-revolution clutch and brake mechanism 32, and further including a friction hub 33 directly secured to the main shaft 23, whereby the friction wheel 31 is rotatable with respect to the friction hub 33, exerting a frictional driving torque therebetween. Further, the mechanism 32 comprises an operating magnet or solenoid 34 that actuates two arms 35 and 36 mounted upon a pivot pin 37, the outer end of the arm 35 normally engaging a pin 38 carried by the adjacent end of the friction hub 33, and the outer end of the arm 36 carrying a dog 39 normally engaging a cooperating notch 40 provided in the periphery of a disk 41 carried by the friction hub 33. Also the arm 36 carries a lug 42; and a brake band 43 cooperating with a substantially cylindrical brake surface provided on the disk 41 is mounted at the opposite ends thereof upon the inner end of the arm 36 and the outer end of the lug 42; whereby the brake band 43 normally engaging the cylindrical surface provided on the disk 41 retains the friction hub 33, as a whole, against rotation, causing the friction wheel 31 to rotate relative to the friction hub 33 when the drive motor 25 is operating and the solenoid 34 is deenergized.

Considering now the mode of operation of the mechanism 32, it will be understood that when the solenoid 34 is energized, the arms 35 and 36 are rocked downwardly about the pivot pin 37, as viewed in Fig. 4, whereby the outer end of the arm 35 disengages the pin 38 and the dog 39 disengages the notch 40 provided in the periphery surface of the disk 41; and simultaneously the lug 42 is rocked downwardly along with the arm 36 about the pivot pin 37 so that the brake band 43 releases the cylindrical surface of the disk 41. Accordingly, at this time, the friction wheel 31 rotates the friction hub 33 therewith, whereby the main shaft 23 is rotated, the main shaft 23 being rotated in the clockwise direction, as viewed in Fig. 1 from the front end of the apparatus 10. Now subsequently when the solenoid 34 is deenergized, the arms 35 and 36 and the lugs 42 are pivoted upwardly, about the pivot pin 37, as viewed in Fig. 4, by biasing means, not shown; whereby the outer end of the arm 35 is returned into the path of movement of the pin 38 so that when the friction hub 33 and the main shaft 23 complete an exact revolution the pin 38 engages the outer end of the arm 35 arresting further rotation thereof. Also at this time the dog 39 re-enters the notch 40 in order to prevent any re-bound of the friction hub 33; and simultaneously with the return movement of the arms 35 and 36 and the lug 42 the friction band 43 again clamps the cylindrical surface of the disk 41 so as to retard rotation thereof and so as to hold the friction hub 33 in its normal rest position when it is moved thereto.

Thus it will be understood that each time the solenoid 34 is energized and subsequently deenergized the friction hub 33 is rotated by the friction wheel 31 one or more complete and exact revolutions, whereby the cylindrical cam 24 is always rotated one or more complete revolutions incident to energization and subsequent deenergization of the solenoid 34.

Figure 5:
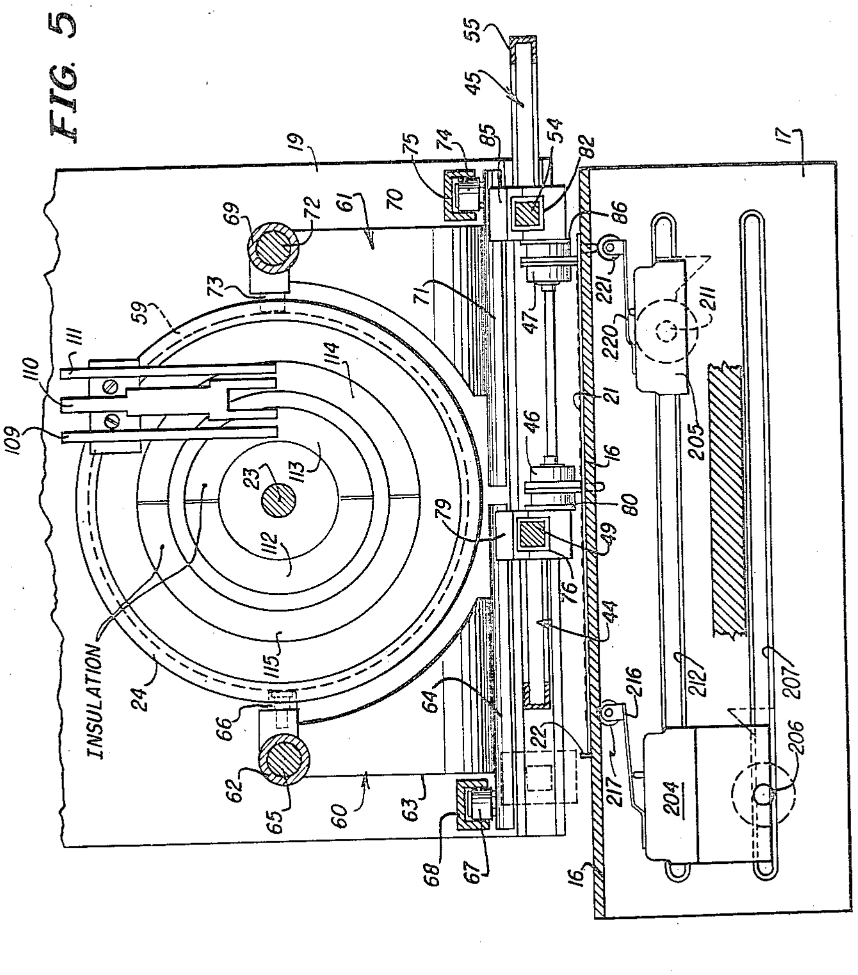
Fig. 5 is an enlarged lateral sectional view, partly broken away, taken in the direction of the arrows along the line 5—5 in Fig. 3.

As best shown in Figs. 1, 4 and 5, the apparatus 10 further comprises odd and even carriages 44 and 45 spaced above the composite platen 15—16 and respectively carrying odd and even electromagnetic transducers or heads 46 and 47 cooperating with the record card 21 carried by the platen 15—16. More particularly, the odd carriage 44 comprises a laterally extending internally threaded tubular member 48, a longitudinally extending square guide bar 49 and a diagonally extending channel-shaped brace 50, the rear ends of the bar 49 and the brace 50 being secured to the opposite ends of the tubular member 48, and the front ends of the bar 49 and the brace 50 being joined and carrying a roller 51 arranged in guided relation with respect to a laterally extending channel 19' carried by the rear surface of the front end plate 19. The tubular member 48 is, in turn, mounted upon a laterally extending index screw 52 suitably carried by the base plate 11; whereby the odd carriage 44 may be indexed laterally with respect to the platen 15—16, and consequently the record card 21, by appropriate rotation of the index screw 52, as explained more fully hereinafter. Similarly, the even carriage 45 comprises a laterally extending internally threaded tubular member 53, a longitudinally extending square guide bar 54 and a diagonally extending channel-shaped brace 55, the rear ends of the bar 54 and the brace 55 being secured to the opposite ends of the tubular member 53, and the front ends of the bar 54 and the brace 55 being joined and carrying a roller 56 arranged in guided relation with respect to the laterally extending channel 19' carried by the rear surface of the front end plate 19. The tubular member 53 is, in turn, mounted upon a laterally extending index screw 57 suitably carried by the base plate 11; whereby the even carriage 45 may be indexed laterally with respect to the platen 15—16, and consequently the record card 21, by appropriate rotation of the index screw 57, as explained more fully hereinafter.

More specifically, the index screws 52 and 57 are arranged in lateral alignment with respect to each other, the inner ends being suitably journalled in a common upstanding stud 58; while the guide bars 49 and 54 of the respective odd and even cariages 44 and 45 are parallel to each other and to the magnetic media respectively provided in the odd and even groups on the record card 21 supported by the composite platen 15—16.

As best shown in Fig. 1, the cylindrical cam 24 has an elongated continuous and endless cam slot or groove 59 formed therein that not only extends longitudinally therealong but also extends circumferentially therearound and having a predetermined configuration explained more fully hereinafter for the purpose of imparting predetermined and correlated longitudinal reciprocatory movements to odd and even cam followers 60 and 61, best shown in Fig. 5, respectively cooperating with the odd and even heads 46 and 47 respectively carried by the odd and even carriages 44 and 45. More specifically, the odd cam follower 60 comprises an upper longitudinally extending tubular member 62, a substantially V-shaped web-like body 63 and a lower laterally extending bar 64. The member 62 is slidably mounted upon a cooperating longitudinally extending guide rod 65 arranged between the front end plate 19 and structure, not shown, carried by the base plate 11, and carries a laterally inwardly projecting roller 66 extending into the cam slot 59 in driven relation therewith. The outer end of the bar 64 carries an upstanding roller 67 arranged in a longitudinally extending inverted channel 68 arranged between the front end plate 19 and structure, not shown, carried by the base plate 11. Accordingly, the longitudinal reciprocatory movement imparted to the odd cam follower 60 by the cooperation between the roller 66 and the cam slot 59 is guided by the cooperation between the tubular member 62 and the guide rod 65 and the cooperation between the roller 67 and the inverted channel 68. Similarly, the even cam follower 61 comprises an upper longitudinally extending tubular member 69, a substantially V-shaped web-like body 70, and a lower laterally extending bar 71. The member 69 is slidably mounted upon a cooperating longitudinally extending guide rod 72 arranged between the front end plate 19 and structure, not shown, carried by the base plate 11, and carries a lateraly inwardly projecting roller 73 extending into the cam slot 59 in driven relation therewith. The outer end of the bar 71 carries an upstanding roller 74 arranged in a longitudinally extending inverted channel 75 arranged between the front end plate 19 and structure, not shown, carried by the base plate 11. Accordingly, the longitudinal reciprocatory movement imparted to the even cam follower 61 by the cooperation between the roller 73 and the cam slot 59 is guided by the cooperation between the tubular member 69 and the guide rod 72 and the cooperation between the roller 74 and the inverted channel 75.

As previously noted, the odd head 46 is slidably mounted upon the longitudinally extending guide bar 49 of the odd carriage 44; and as best shown in Figs. 3, 4, and 5 a longitudinally extending tubular member 76 is directly slidably arranged on the bar 49 and carries a downwardly projecting stud 77 supporting a pivot pin 78, upon which there are pivotally mounted an upstanding yoke 79 and a longitudinally extending projection 80, the odd head 46 being directly secured to the projection 80. The upper end of the yoke 79 is bifurcated providing a centrally disposed slot 81 therein that receives the laterally extending bar 64 of the odd cam follower 60; whereby the odd carriage 44 may be indexed laterally with respect to the opposite platen 15—16, while preserving cooperative engagement between the bar 64 and the yoke 79. As best shown in Fig. 3, when the odd cam follower 60 is moved longitudinally toward the right the cooperation between the bar 64 and the yoke 79 effects corresponding movement of the tubular member 76 along the longitudinal guide bar 49 of the odd carriage 44; whereby the odd head 46 carried by the tubular member 76 is also moved longitudinally toward the right in a translating movement, with respect to the record card 21 supported by the composite platen 15—16. Also in this connection, it will be observed that the longitudinal movement of the bar 64 toward the right effects rotation of the yoke 79 and the projection 80 in the clockwise direction about the pivot pin 78, as viewed in Fig. 3; whereby the projection 80 rotates the odd head 46 downwardly into firm longitudinal sliding engagement with the corresponding magnetic medium carried by the record card 21 in the translating movement of the odd head 46. On the other hand, when the odd cam follower 60 is returned longitudinally toward the left, the bar 64 effects rotation of the yoke 79 and the projection 80 in the counterclockwise direction about the pivot pin 78, as viewed in Fig. 3, as the tubular member 76 is returned in the longitudinal direction toward the left; whereby the odd head 46 carried by the projection 80 is lifted upwardly out of sliding engagement with the corresponding magnetic medium carried by the record card 21 in the longitudinal restoration of the odd head 46 back toward the left in its non-translating movement.

As previously noted, the even head 47 is slidably mounted upon the longitudinally extending guide bar 54 of the even carriage 45; and as best shown in Figs. 3, 4 and 5 a longitudinally extending tubular member 82 is directly slidably arranged on the bar 54 and carries a downwardly projecting stud 83 supporting a pivot pin 84, upon which there are pivotally mounted an upstanding yoke 85 and a longitudinally extending projection 86, the even head 47 being directly secured to the projection 86. The upper end of the yoke 85 is bifurcated providing a centrally disposed slot 87 therein that receives the laterally extending bar 71 of the even cam follower 61; whereby the even carriage 45 may be indexed laterally with respect to the composite platen 15—16, while preserving cooperative engagement between the bar 71 and the yoke 85. As best shown in Fig. 3, when the even cam follower 61 is moved longitudinally toward the right, the cooperation between the bar 71 and the yoke 85 effects corresponding movement of the tubular member 82 along the longitudinal guide bar 54 of the even carriage 45; whereby the even head 47 carried by the tubular member 82 is also moved longitudinally toward the right in a translating movement with respect to the record card 21 supported by the composite platen 15—16. Also in this connection, it will be observed that the longitudinal movement of the bar 71 toward the right effects rotation of the yoke 85 and the projection 86 in the clockwise direction about the pivot pin 84, as viewed in Fig. 3; whereby the projection 86 rotates the even head 47 downwardly into firm longitudinal sliding engagement with the corresponding magnetic medium carried by the record card 21 in the translating movement of the even head 47. On the other hand, when the even cam follower 61 is returned longitudinally toward the left, the bar 71 effects rotation of the yoke 85 and the projection 86 in the counterclockwise direction about the pivot pin 84, as viewed in Fig. 3, as the tubular member 82 is returned in the longitudinal direction toward the left; whereby the even head 47 carried by the projection 86 is lifted upwardly out of sliding engagement with the corresponding magnetic medium carried by the record card 21 in the longitudinal restoration of the even head 47 back toward the left in its non-translating movement.

In view of the foregoing description of the cooperation between the cylindrical cam 24 and the odd and even cam followers 60 and 61 and the cooperation between the odd and even followers 60 and 61 and the respectively associated yokes 79 and 85 operatively associated with the respective odd and even heads 46 and 47, it will be understood that the odd and even cam followers 60 and 61 are reciprocated longitudinally in alternate translating and non-translating movements, so that the odd head 46 is moved longitudinally toward the right in a translating operation while the even head 47 is moved longitudinally toward the left in a non-translating operation, as viewed in Fig. 3; and subsequently the even head 47 is moved longitudinally toward the right in a translating operation while the odd head 46 is moved longitudinally toward the left in a non-translating operation, as viewed in Fig. 3. Also as each of the recording heads 46 and 47 is moved longitudinally toward the right in a translating movement it is pivoted downwardly into firm sliding engagement with the cooperating magnetic medium carried by the record card 21; and when each of the recording heads 46 and 47 is moved longitudinally toward the left in a non-translating movement, it is pivoted upwardly out of sliding engagement with the cooperating magnetic medium carried by the record card 21. This arrangement, whereby the recording heads 46 and 47 are moved into firm engagement with the magnetic media upon the record card 21 in the translating movements thereof, insures proper magnetic translation thereby; and this arrangement, whereby the recording heads 46 and 47 are moved out of engagement with the magnetic media upon the record card 21 in the non-translating movements thereof, prevents unnecessary wear thereby of the magnetic media upon the record card 21.

Reverting to the lateral indexing of the odd and even carriages 44 and 45 with respect to the composite platen 15—16, and referring to Figs. 1, 3 and 4, it is pointed out that the respective odd and even index screws 52 and 57 are alternately rotated through one-quarter turns by means of respectively associated Geneva mechanisms, only the Geneva mechanism 88 operatively associated with the index screw 52 being illustrated. Specifically, the Geneva mechanism 88 individually associated with the odd index screw 52 comprises a Geneva gear 89 directly mounted upon a laterally projecting stub shaft 90 carried on the extreme outer end of the odd index screw 52, a section of the stub shaft 90 being supported by an adjacent bearing 91. Also operatively associated with the Geneva gear 89 is a Geneva rod 92 carried by an arm 93 provided on the extreme outer end of an associated Geneva shaft 94 rotatably supported in suitable bearings 94′ carried by the base plate 11. As viewed in Fig. 3, upon each rotation of the Geneva shaft 94 in the counterclockwise direction, the Geneva rod 92 engages and subsequently disengages one of the four slots provided in the Geneva gear 89; whereby the Geneva gear 89 and the odd index screw 52 are rotated in the clockwise direction one-quarter of a revolution so as to advance or index the odd carriage 44 one step laterally toward the main shaft 23 effecting a corresponding indexing of the odd head 46 laterally a distance of 3/16″ corresponding to the distance between the center lines of adjacent ones of the magnetic media in the odd group carried by the record card 21. The Geneva shaft 94 is selectively rotated by the main shaft 23 during rotation of the latter shaft through a drive including an electromagnetic index clutch 95, and a pair of right angularly aligned pulleys 96 and 97 respectively carried by the main shaft 23 and by the index clutch 95, the pulleys 96 and 97 being interconnected by a right angularly twisted belt 98. Accordingly, when the main shaft 23 is continuously rotated in the clockwise direction as viewed from the front end thereof, adjacent to the front end plate 19 in Fig. 3, and the solenoid of the index clutch 95 is energized, the Geneva shaft 94 is continuously rotated in the counterclockwise direction as viewed in Fig. 3; whereby the odd index screw 52 is intermittently rotated in the clockwise direction, as viewed in Fig. 3, each revolution of the Geneva shaft 94 effecting a step of one-quarter of one revolution of the odd index screw 52, this screw 52 being of the triple thread type.

The even Geneva mechanism, not shown, that is individually associated with the even index screw 57 is identical to the odd Geneva mechanism 88 and is operated from the common Geneva shaft 94; however, the odd and even Geneva mechanisms are alternately operated approximately 180° out-of-phase with respect to each other so that the odd and even carriages 44 and 45 are indexed alternately in this phased relationship.

For the purpose of restoring the odd and even Geneva mechanisms back into their home positions, an arrangement is provided that includes a laterally extending restoring shaft 99 common to the two Geneva mechanisms and supported upon the base plate 11 by suitable bearings 99′. The restoring shaft 99 is driven from the main shaft 23 by an arrangement including a pair of right angularly aligned pulleys 101 and 102 respectively carried by the shafts 23 and 99, the pulleys 101 and 102 being interconnected by a right angularly twisted belt 103. Accordingly, when the main shaft 23 is rotated in the clockwise direction as viewed from the front end thereof, adjacent to the front end plate 19 in Fig. 3, the restoring shaft 99 is rotated in the counterclockwise direction, as viewed in Fig. 3. The restoring shaft 99 supports odd and even electromagnetic slip clutches, the odd electromagnetic slip cluch being illustrated at 104, and including a pulley 105 connected by a belt 106 to a pulley 107 carried by the stub shaft 90 carried, in turn, by the odd index screw 52. The even electromagnetic slip clutch, not shown, that is operatively associated with the even Geneva mechanism, not shown, is identical to the odd electromagnetic slip clutch 104. Accordingly, it will be understood that when the restoring shaft 99 is rotated and the solenoids of the odd and even electromagnetic slip clutches are energized, the respective odd and even Geneva mechanisms are restored, effecting restoration of the corresponding odd and even index screws 52 and 57 and consequent lateral restoration of the corresponding odd and even carriages 44 and 45.

More particularly, when the solenoid of the odd electromagnetic slip clutch 104 is energized the pulley 105 is rotated in the counterclockise direction with the restoring shaft 99, as viewed in Fig. 3; whereby the pulley 107 is rotated in the counterclockwise direction through the belt 106 so that the odd index screw 52 is rotated in the counterclockwise direction effecting the corresponding restoration of the odd carriage 44 in the lateral direction.

The relationship between the coordinate longitudinal movements of the odd and even heads 46 and 47 produced by rotation of the cylindrical cam 24 with respect to the record card 21 supported by the composite platen 15—16 will best be understood by reference to Fig. 7, wherein two sinuous curves 108 and 109 are illustrated, the curve 108 being solid and corresponding to the longitudinal path of travel of the odd head 46 in relation to the rotation of the cylindrical cam 24, and the curve 109 being dotted and corresponding to the longitudinal path of travel of the even head 47 in relation to the rotation of the cylindrical cam 24. In Fig. 7 the longitudinal distance A corresponds to the length of 11″ of the record card 21; the longitudinal distance B is appropriately shorter than the longitudinal distance A and corresponds to the total travel in the longitudinal direction of the odd and even heads 46 and 47; the longitudinal distance C is appropriately shorter than the longitudinal distance B and corresponds to the travel in the longitudinal direction of the odd and even heads 46 and 47 at the uniform translating velocity thereof of approximately 2.13″ per second; and the longitudinal distance D is appropriately shorter than the longitudinal distance C and corresponds to the length of 10″ of the magnetic media carried upon the record card 21. In order to obtain the translating speed of approximately 2.13″ per second of the odd and even heads 46 and 47 the cylindrical cam 24 is rotated at 6.39 R. P. M. by the drive motor 25 through the Hilliard mechanism 32.

Following the curve 108 corresponding to the movement of the odd head 46 it will be observed that the odd head 46 has been moving longitudinally toward the right at the uniform translating velocity of about 2.13″ per second for about 10° of rotation of the cylindrical cam 24 when the cylindrical cam 24 reaches its 0° position; the odd head 46 continues to move longitudinally toward the right in its translating movement through the next 180° of rotation of the cylindrical cam 24; the odd head 46 continues to move longitudinally toward the right at the uniform translating velocity for about 10° of additional rotation of the cylindrical cam 24; and then the odd head 46 begins its turn-around and return movement in the longitudinal direction back toward the left. Accordingly, it will be understood that the odd head 46 is moved longitudinally toward the right at the uniform translating velocity throughout about 200° of rotation of the cylindrical cam 24; however, only 180° of rotation of the cylindrical cam 24 is actually employed for translation purposes by the odd recording head 46, as explained more fully hereinafter.

Continuing with the curve 108, it will be understood that the odd head 46 is turned around, returned in the longitudinal direction toward the left and is again turned-around and moved in the longitudinal direction toward the right within the rotation of the cylindrical cam 24 between the 180° and the 350° positions thereof so that when the cylindrical cam 24 reaches its 360° position, the odd head 46 has been moving longitudinally toward the right at the uniform translating velocity for 10° of rotation of the cylindrical cam 24. The path of movement of the odd head 46 is cyclic, whereby in each 360° of rotation of the cylindrical cam 24, the odd head 46 is moved longitudinally toward the right at the uniform translating velocity through 200° of the rotation of the cylindrical cam 24, the intermediate 180° of rotation of the cylindrical cam 24 corresponding to the actual translating movement of the odd head 46, as explained more fully hereinafter.

Following the curve 109 corresponding to the movement of the even head 47, it will be observed that the curve 109 is identical to the curve 108 except that it is displaced with respect thereto by 180° of rotation of the cylindrical cam 24. Accordingly, in the rotation of the cylindrical cam 24, the odd head 46 is moved longitudinally toward the right in its translating movement between 0° and 180° of the rotation of the cylindrical cam 24; the even head 47 is moved longitudinally toward the right in its translating movement between 180° and 360° of the rotation of the cylindrical cam 24; translating movement is again imparted to the odd head 46 in the rotation of the cylindrical cam 24 between its 360° and its 540° positions; translating movement is again imparted to the even head 47 in the rotation of the cylindrical cam 24 between its 540° and its 720° positions; etc. At the conclusion of the longitudinal translating movement of the odd head 46, the odd carriage 44 is indexed laterally with respect to the composite platen 15—16 by the odd Geneva mechanism 88; and at the conclusion of the longitudinal translating movement of the even head 47 the even carriage 45 is indexed laterally with respect to the composite platen 15—16 by the even Geneva mechanism, not shown.

In view of the foregoing description of the movements of the odd and even heads 46 and 47 and the indexing of the odd and even carriages 44 and 45, it will be understood with reference to the record card 21, the odd head 46 is first translated along line 1 of the associated magnetic media, while the even head 47 is indexed and brought into cooperative relation with respect to line 2 of the associated magnetic media; the even head 47 is then translated along line 2 of the associated magnetic media, while the odd head 46 is indexed and brought into cooperative relation with respect to line 3 of the associated magnetic media; etc. Hence the odd head 46 is translated in sequence along the odd lines 1, 3, etc., in the odd group of magnetic media, and the even head 47 is translated in sequence along the even lines 2, 4, etc., in the even group of the magnetic media; the translation of the odd and even heads 46 and 47 being alternate so that the translation of the sequential lines of magnetic media by the odd and even heads is continuous without any time interval between the translation of adjacent lines of magnetic media.

In order to achieve alternate translation by the odd and even heads 46 and 47, a cyclic switching arrangement is provided between the heads 46 and 47 and the associated electric circuit, described more fully hereinafter; which cyclic switching arrangement includes, as beat shown in Fig. 5, a stationary brush set and inner and outer rotatable commutators. The brush set includes three individual brushes 109, 110 and 111; the inner commutator includes a conducting segment 112 and an insulating segment 113 secured to the adjacent rear end of the cylindrical cam 24; and the outer commutator includes a conducting segment 114 and an insulating segment 115 secured to the adjacent rear end of the cylindrical cam 24. The middle brush 110 is bifurcated to provide two spring ends respectively cooperating with the inner and outer commutators; the brush 109 cooperates only with the inner commutator; and the brush 111 cooperates only with the outer commutator. The segments 112 and 113 of the inner commutator are substantially supplementary, each subtending approximately 180° and the segments 114 and 115 of the outer commutator are substantially supplementary, each subtending approximately 180°. In the arrangement, the conducting segments 112 and 114 are disposed approximately 180° out-of-phase with respect to each other; and likewise, the insulating segments 113 and 115 are disposed approximately 180° out-of-phase with respect to each other. Accordingly as the cylindrical cam 24 is rotated the brush 109 is connected to the brush 110 during engagement thereof with the conducting segment 112, and throughout substantially 180° of the rotation of the cylindrical cam 24; and likewise, the brush 111 is connected to the brush 110 during engagement thereof with the conducting segment 114 and throughout substantially the next 180° of rotation of the cylindrical cam 24. The winding, not shown, of the odd electromagnetic transducer 46 is operatively encircuited between the brushes 109 and 110; and the winding, not shown, of the even electromagnetic transducer 47 is operatively encircuited between the brushes 111 and 110; whereby the external electric circuit, described more fully hereinafter, is alternately switched or coupled between the transducers 46 and 47 to provide the substantially continuous connection mentioned between the external electric circuit and one of the transducers 46 and 47.

Considering now the electric control system 200 for the apparatus 10 and referring to Fig. 8, it will be observed that there are diagrammatically illustrated the various electrical components including the recording heads 46 and 47, the brushes 109, 110 and 111, the conducting segments 112 and 114, the insulating segments 113 and 115, the drive motor 25, the start solenoid 34 of the Hilliard mechanism 32, the solenoid 95' of the index clutch 95, the solenoid 104' of the odd return clutch 104, and the solenoid 201 of the even return clutch, not shown. Also the control circuit 200 comprises an odd carriage off-normal switch 202 and an even carriage off-normal switch 203. The odd and even off-normal switches 202 and 203 are carried by the base plate 11, as illustrated in Figs. 1 and 4, and are respectively associated with the odd and even carriages 44 and 45; whereby the odd and even switches 202 and 203 are respectively controlled when the respective carriages 44 and 45 are moved out of and back into their normal home positions, as explained more fully hereinafter.

Also as illustrated in Fig. 8, the control circuit 200 comprises a start record switch 204 and a finish record switch 205 that are incorporated in the apparatus 10, as best illustrated in Figs. 1, 2 and 5. More particularly, the start record switch 204 is of the micro-switch type and is slidably mounted behind the front apron 17 for lateral movements with respect thereto, the start record switch 204 being mounted upon a rod 206, projecting through a laterally extending slot 207 formed adjacent to the lower portion of the front apron 17. The rod 206 slidably mounted in the laterally extending slot 207 terminates in an exteriorly disposed manual control knob 208 and carries an index pointer 209 cooperating with an adjacent magnetic media index 210 provided on the front surface of the apron 17, as best shown in Fig. 2. More particularly, the finish record switch 205 is of the micro-switch type, and is slidably mounted behind the front apron 17 for lateral movements with respect thereto, the finish record switch 205 being mounted upon a rod 211 projecting through a laterally extending slot 212 formed adjacent to the upper portion of the front apron 17. The rod 211 slidably mounted in the laterally extending slot 212 terminates in an exteriorly disposed manual control knob 213 and carries an index pointer 214 cooperating with an adjacent magnetic media index 215 provided on the front surface of the apron 17, as best shown in Fig. 2. As best shown in Figs. 2, 3, 4 and 5, the start record switch 204 comprises a contact actuating lever 216 carrying a roller 217 disposed below the platen 15 and cooperating with a plunger 218 carried on the extreme outer end of the odd carriage 44 and projecting through an adjacent laterally extending slot 219 formed in the platen 16; and likewise, the finish record switch 205 comprises a contact actuating lever 220 carrying a roller 221 disposed below the platen 16, and cooperating with a plunger 222 carried on the extreme outer end of the even carriage 45 and projecting through an adjacent laterally extending slot 223 formed in the platen 16. In view of the foregoing description of the start record switch 204 and the stop record switch 205, it will be understood that when the odd carriage 44 occupies a position bringing the odd head 46 into cooperation with the particular magnetic medium on the record card 21 corresponding to the adjusted position of the rod 206, as indicated by the index pointer 209, the start record switch 204 is actuated by the associated plunger 218; and likewise, when the even carriage 45 occupies a position bringing the even head 47 into cooperation with the particular magnetic medium on the record card 21 corresponding to the adjusted position of the rod 211, as indicated by the index pointer 214, the finish record switch 205 is actuated by the associated plunger 222. This arrangement permits the preselection by the manual control knob 208 of the particular odd magnetic medium upon the record card 21 at which the translation is to begin by the odd head 46, and permits the preselection by the control knob 213 of the particular even magnetic medium upon the record card 21 at which the translation is to end by the even head 47. Hence by appropriate adjustment of the manual control knobs 208 and 213, the odd beginning line and the even finishing line upon the record card 21 that are to be employed in a translation may be selectively set.

Again referring to Fig. 8, it will be observed that in the control circuit 200 the start record switch 204 comprises a single pair of contacts that is open when the plunger 218 disengages the roller 217; while the finish record switch 205 comprises two pairs of contacts 223 and 224 that are respectively open and closed when the plunger 222 disengages the roller 221. Further the control circuit 200 comprises, as illustrated in Fig. 8, a source of power supply of 110 volts A. C. single phase, a master switch 225 of the single-throw type, a recording and reproducing switch 226 of the double-throw type, and a relay network including a pickup relay R230, a start relay R240, a finish relay R250, and a switch relay R260. Further, the control circuit 200 comprises a conventional master record unit 270 of the tape recording-reproducing type and including an electric drive motor 271, winding and unwinding reels 272 and 273 interconnected by a master magnetic tape 274, and a cooperating electromagnetic pickup head 275. The master magnetic tape 274 carries a conductor segment 276 that cooperates with a pair of sensing brushes 277. Further, the electric control circuit 200 comprises a conventional loudspeaker 278, a recording amplifier 279, provided with a pair of input terminals, and a pair of output terminals and a pair of power terminals, and a reproducing amplifier 280 provided with a pair of input terminals and a pair of output terminals and a pair of power terminals. The recording and reproducing switch 226 is of the double-throw type, as previously noted, including lower or recording contact pairs 281, 282, 283 and 284 and upper or reproducing contact pairs 285, 286, 287 and 288. When the recording and reproducing switch 226 occupies its recording position the contact pairs 281 to 284, inclusive, are closed, and the contact pairs 285 to 288, inclusive, are open; and conversely when the recording and reproducing switch 226 occupies its reproducing position the contact pairs 285 to 288, inclusive, are closed, and the contact pairs 281 to 284 are open. Finally, the control circuit 200 comprises a start push-button switch 295, and a pair of busses 291 and 292 that are selectively energized in accordance with the position of the master switch 225 and that are employed in the selective control of the apparatus incorporated therein, as explained more fully hereinafter.

Considering now the operation of the apparatus 10 in conjunction with the control circuit 200, the carrying out of a recording operation will now be described, and it will be assumed that it is desirable to record upon an unused record card 21 intelligence previously magnetically recorded upon the master record tape 274, and that this intelligence is to be recorded upon the arbitrarily selected lines 5 to 34, inclusive, of the record card 21. In this case, an unused record card is appropriately supported upon the composite platen 15—16 in proper position as established by the guide pins 22 so that it is securely retained in place; and it may be assumed that the odd and even heads 46 and 47 occupy their normal home positions. The manual control knobs 208 and 213 are respectively set to bring the index pointers 209 and 214 into respective cooperation with the indicia 5 and 34 appearing upon the respective scales 210 and 215. The manual control knobs 208 and 213 are then locked in place; whereby the active section of the record card 21 involving lines 5 to 34, inclusive, thereof, is effectively selected. Further, it may be assumed that the master tape 274 is properly wound upon the reel 273 and is in position to be unwound therefrom onto the reel 272. At this time, the operator actuates the recording and reproducing switch 226 into its recording position and then actuates the master switch 225 into its closed position so that power is connected to the busses 291 and 292. When power is thus connected to the busses 291 and 292 it is supplied to the power terminals of the recording amplifier 279 rendering the same operative, and the drive motor 271 of the master recording unit 270 is operated; whereby the master tape 274 is wound from the reel 273 upon the reel 272. Also at this time, the electric drive motor 25 of the apparatus 10 is operated. When the conducting segment 276 carried by the master tape 274 passes the sensing brushes 277, a circuit is completed for energizing the winding of the pickup relay R230 across the busses 291 and 292 and including the closed contacts 224 of the finish record switch 205; whereby the pickup relay R230 is operated closing its contacts 231 so as to complete a holding circuit therefor independent of the sensing brushes 277 in view of the fact that the conducting segment 276 only engages momentarily the sensing brushes 277. Also upon operating the pickup relay R230 prepares, at the contacts 232, a circuit, traced hereinafter, for energizing the winding of the start relay R240; and completes, at the contacts 233, a circuit for energizing the start solenoid 34 of the Hilliard mechanism 32. When the solenoid 34 of the Hilliard mechanism 32 is thus energized, the friction wheel 31 is clutched to the friction hub 33, as previously explained; whereby the main shaft 23 is rotated in the clockwise direction, as viewed from the front end plate 19, effecting corresponding rotation of the cylindrical cam 24. Also the solenoid 34 of the Hilliard mechanism 32 closes its contacts 34′, completing a circuit, including the contacts 253, for energizing the solenoid 95′ of the index clutch 95 across the busses 291 and 292. When the solenoid 95′ of the index clutch 95 is thus energized, the Geneva shaft 94 is driven by the main shaft 23, in the manner previously explained. Accordingly, at this time the odd and even heads 46 and 47 are alternately moved longitudinally, and the odd and even carriages 44 and 45 are alternately indexed laterally, all in the manner previously explained.

When the odd carriage 44 is moved out of its normal home position, the odd carriage off-normal switch 202 is closed to prepare a holding circuit, traced hereinafter, for energizing the winding of the finish relay R250; and when the even carriage 45 is moved out of its normal home position, the even carriage off-normal switch 203 is closed to prepare a multiple holding circuit, traced hereinafter, for energizing the winding of the finish relay R250.

Subsequently when the odd head 46 is moved into cooperating relation with line 5 on the record card 21, the start record switch 204 is closed by virtue of the cooperation between the plunger 218 and the roller 217, as a consequence of the setting of the manual control knob 208, as previously explained. The closure of the start record switch 204 completes a circuit, including the contacts 232, for energizing the winding of the start relay R240 across the busses 291 and 292; whereby the latter relay operates to complete, at the contacts 242, a holding circuit for itself in multiple with the start record switch 204, since the start record switch 204 is retained in its closed position only during a short time interval. Also the start relay R240 completes, at the contacts 241, a circuit for energizing the winding of the switch relay R260 across the busses 291 and 292. Upon operating the switch relay R260 completes, at the contacts 261 and 262, a circuit between the output terminals of the recording amplifier 279 and the heads 46 and 47 that includes the contacts 281 and 282, as well as the brushes 109, 110 and 111 cooperating with the conducting segments 112 and 114 of the two commutators. Accordingly, the magnetic recording upon the master tape 274 is picked-up by the pickup head 275 and supplied to the input terminals of the recording amplifier 279; and the output of the recording amplifier 279 is supplied via the output terminals thereof to the recording heads 46 and 47 alternately by virtue of the commutating arrangement. Hence it will be understood that the intelligence previously recorded upon the master tape 274 is translated to the recording heads 46 and 47 continuously beginning at line 5 on the record card 21 and ultimately ending on line 34 thereof, as explained more fully below.

After the recording of intelligence upon line 34 on the record card 21, the even carriage 45 is indexed laterally; whereby the plunger 222 cooperating with the roller 221 effects operation of the finish record switch 205, the contacts 223 and 224 thereof being respectively and sequentially closed and opened. Opening of the contacts 224 of the finish record switch 205 interrupts the holding circuit for retaining operated the pickup relay R230; while closure of the contacts 223 of the finish record switch 205 completes a circuit for energizing the winding of the finish relay R250 across the busses 291 and 292. Accordingly, the finish relay R250 operates to complete, at its contacts 251, a holding circuit in multiple to the contacts 223 of the finish record switch 205 so that the finish relay R250 is retained in its operated position independently of the position of the finish record switch 205, the holding circuit mentioned including the closed odd carriage off-normal switch 202 and the closed even carriage off-normal switch 203, the switches 202 and 203 being arranged in multiple. Further the finish relay R250 completes, at the contacts 254, a multiple circuit for energizing the start solenoid 34 of the Hilliard mechanism 32. When the contacts 224 of the finish record switch 205 are opened, as noted above, the pickup relay R230 restores, and interrupts, at the contacts 232, the circuit for retaining operated the start relay R240; whereby the latter relay restores to interrupt, at the contacts 241, the circuit for retaining operated the switch relay R260. Hence, the switch relay R260 restores to interrupt, at the contacts 261 and 262, the connection between the output terminals of the recording amplifier 279 and the heads 46 and 47; whereby no further recording upon the record card 21 beyond line 34 thereof takes place regardless of the length of the intelligence upon the master tape 274.

Also upon operating the finish relay R250 interrupts, at the contacts 253, the circuit for energizing the solenoid 95′ of the index clutch 95; whereby the Geneva shaft 94 is disconnected from the main shaft 23. Further, the finish relay R250 completes, at the contacts 252, multiple circuits for energizing the solenoids 104′ and 201 of the respective odd return clutch 104 and the even return clutch, not shown; whereby the rotating return shaft 99 is connected to the odd Geneva mechanism 88 and to the even Geneva mechanism, not shown, so that the two Geneva mechanisms mentioned are returned back into their normal positions, effecting the corresponding return of the index screws 57 and 52; whereby the odd and even carriages 44 and 45 are returned back into their respective normal home positions.

When the odd carriage 44 is returned back into its normal home position, the odd return clutch 104 accommodates slipping and the odd carriage off-normal switch 202 is operated into its off position; and when the even carriage 45 is returned back into its normal home position, the even return clutch, not shown, accommodates slipping, and the even carriage off-normal switch 203 is operated into its open position. When both of the switches 202 and 203 are thus operated into their open positions as a consequence of the return of the respective odd and even carriages 44 and 45 back into their respective normal home positions, the holding circuit for retaining operated the finish relay R250 is interrupted; whereby the latter relay restores to interrupt, at the contacts 252, the multiple circuits for energizing the solenoids 104' and 201 of the respective odd return clutch 104 and the even return clutch, not shown; whereby the return shaft 99 is disconnected from the odd Geneva mechanism 83 and the even Geneva mechanism, not shown. Further, the finish relay R250 upon restoring interrupts, at the contacts 254, the holding circuit for retaining energized the start solenoid 34 of the Hilliard mechanism 32; whereby upon the next complete revolution of the main shaft 23, further rotation of the main shaft 23 is arrested by virtue of the operation of the Hilliard mechanism 32, in the manner previously explained.

At this time, the operation of the apparatus 10 is complete, although the drive motor 25 is running idle; whereby the operator may return the master switch 225 back into its open position so as to arrest operation of the drive motor 25. Further, when the master switch 225 is thus opened, the circuit for operating the drive motor 271 of the master record unit 270 and the multiple circuit for supplying power to the recording amplifier 279 are interrupted arresting operation of these two elements. At this time, the control circuit 200 occupies its normal rest position and the intelligence has been recorded upon the record card 21 in the continuous section thereof involving lines 5 to 34, inclusive, as explained above.

Reconsidering now the operation of the apparatus 10 in conjunction with the control circuit 200, the carrying out of a reproducing operation will now be described, and it will be assumed that it is desirable to reproduce intelligence previously recorded upon a record card 21 and that the portion of the intelligence to be reproduced appears in the section of the record card 21 arbitrarily selected between lines 7 and 36 thereof. In this case, the previously made record card 21 is appropriately supported upon the composite platen 15—16 in proper position as established by the guide pins 22 so that it is securely retained in place; and it may be assumed that the odd and even heads 46 and 47 occupy their normal home positions. The manual control knobs 208 and 213 are respectively set to bring the index pointers 209 and 214 into respective cooperation with the indicia 7 and 36 appearing upon the respective scales 210 and 215. The manual control knobs 208 and 213 are then locked in place; whereby the active section of the record card 21 involving lines 7 to 36 inclusive, thereof is effectively selected. At this time, the operator actuates the recording and reproducing switch 226 into its reproducing position, actuates the master switch 225 into its closed position so that power is connected to the busses 291 and 292, and then momentarily operates the start pushbutton 295. When power is thus connected to the busses 291 and 292, it is supplied to the power terminals of the reproducing amplifier 280 rendering the same operative, and the electric drive motor 25 of the apparatus 10 is operated. The momentary operation of the start pushbutton 295 completes a circuit for energizing the winding of the pickup relay R230 across the busses 291 and 292 and including the closed contacts 224 of the finish record switch 205; whereby the pickup relay R230 is operated closing its contacts 231 so as to complete a holding circuit therefor independent of the pushbutton switch 295 in view of the fact that the pushbutton switch 295 is only momentarily operated. Also upon operating the pickup relay R230 prepared, at the contacts 232, a circuit, traced hereinafter, for energizing the winding of the start relay R240; and completes, at the contacts 233, a circuit for energizing the start solenoid 34 of the Hilliard mechanism 32. When the solenoid 34 of the Hilliard mechanism 32 is thus energized, the friction wheel 31 is clutched to the friction hub 33, as previously explained; whereby the main shaft 23 is rotated in the clockwise direction, as viewed from the front end plate 19, effecting corresponding rotation of the cylindrical cam 24. Also the solenoid 34 of the Hilliard mechanism 32 closes its contacts 34', completing a circuit, including the contacts 253, for energizing the solenoid 95' of the index clutch 95 across the busses 291 and 292. When the solenoid 95' of the index clutch 95 is thus energized, the Geneva shaft 94 is driven by the main shaft 23, in the manner previously explained. Accordingly, at this time the odd and even heads 46 and 47 are alternately moved longitudinally, and the odd and even carriages 44 and 45 are alternately indexed laterally, all in the manner previously explained. When the odd carriage 44 is moved out of its normal home position, the odd carriage off-normal switch 202 is closed to prepare a holding circuit, traced hereinafter, for energizing the winding of the finish relay R250; and when the even carriage 45 is moved out of its normal home position, the even carriage off-normal switch 203 is closed to prepare a multiple holding circuit, traced hereinafter, for energizing the winding of the finish relay R250.

Subsequently, when the odd head 46 is moved into cooperating relation with line 7 on the record card 21, the start record switch 204 is closed by virtue of the cooperation between the plunger 218 and the roller 217, as a consequence of the setting of the manual control knob 208, as previously explained. The closure of the start record switch 204 completes a circuit, including the contacts 232, for energizing the winding of the start relay R240 across the busses 291 and 292; whereby the latter relay operates to complete, at the contacts 242, a holding circuit for itself in multiple with the start record switch 204, since the start record switch 204 is retained in its closed position only during a short time interval. Also the start relay R240 completes, at the contacts 241, a circuit for energizing the winding of the switch relay R260 across the busses 291 and 292. Upon operating the switch relay R260 completes, at the contacts 261 and 262, a circuit between the input terminals of the reproducing amplifier 280 and the heads 46 and 47 that includes the contacts 287 and 288, as well as the brushes 109, 110 and 111 cooperating with the conducting segments 112 and 114 of the two commutators. Accordingly, the magnetic recording upon the record card 21 is picked-up alternately by the heads 46 and 47 and supplied to the input terminals of the reproducing amplifier 280; and the output of the reproducing amplifier 280 is supplied to the loudspeaker 278. Hence, it will be understood that the intelligence previously recorded upon the record card 21 is translated to the loudspeaker 278 beginning at line 7 on the record card 21 and ultimately ending on line 36 thereof, as explained more fully below.

After the reproduction of intelligence from line 36 of the record card 21, the even carriage 45 is indexed laterally; whereby the plunger 222 cooperating with the roller 221 effects operation of the finish record switch 205, the contacts 223 and 224 thereof being respectively and sequentially closed and opened. Opening of the contacts 224 of the finish record switch 205 interrupts the holding circuit for retaining operated the pickup relay R230; while closure of the contacts 223 of the finish record switch 205 completes a circuit for energizing the winding of the finish relay R250 across the busses 291 and 292. Accordingly, the finish relay R250 operates to complete, at its contacts 251, a holding circuit in multiple to the contacts 223 of the finish record switch 205 so that the finish relay R250 is retained in its operated position independently of the position of the finish record switch 205, the holding circuit mentioned including the closed odd carriage off-normal switch 202 and the closed even carriage off-normal switch 203, the switches 202 and 203 being arranged in multiple. Further, the finish relay R250 completes, at the contacts 254, a multiple circuit for energizing the start solenoid 34 of the Hilliard mechanism 32. When the contacts 224 of the finish record switch 205 are opened, as noted above, the pickup relay R230 restores, and interrupts, at the contacts 232, the circuit for retaining operated the start relay R240; whereby the latter relay restores to interrupt, at the contacts 241, the circuit for retaining operated the switch relay R260. Hence, the switch relay R260 restores to interrupt, at the contacts 261 and 262, the connection between the input terminals of the reproducing amplifier 280 and the heads 46 and 47; whereby no further reproduction from the record card 21 beyond line 36 thereof takes place regardless of the length of the intelligence upon the record card 21.

Also upon operating the finish relay R250 interrupts, at the contacts 253, the circuit for energizing the solenoid 95' of the index clutch 95; whereby the Geneva shaft 94 is disconnected from the main shaft 23. Further, the finish relay R250 completes, at the contacts 252, multiple circuits for energizing the solenoids 104' and 201 of the odd return clutch 104 and the even return clutch, not shown; whereby the rotating return shaft 99 is connected to the odd Geneva mechanism 88 and to the even Geneva mechanism, not shown, so that the two Geneva mechanisms mentioned are returned back into their normal positions effecting the corresponding return of the index screws 57 and 52; whereby the odd and even carriages 44 and 45 are returned back into their respective normal home positions.

When the odd carriage 44 is returned back into its normal home position, the odd return clutch 104 accommodates slipping and the odd carriage off-normal switch 202 is operated into its open position; and when the even carriage 45 is returned back into its normal home position, the even return clutch, not shown, accommodates slipping, and the even carriage off-normal switch 203 is operated into its open position. When both of the switches 202 and 203 are thus operated into their open positions, as a consequence of the return of the respective odd and even carriages 44 and 45 back into their respective normal home positions, the holding circuit for retaining operated the finish relay R250 is interrupted; whereby the latter relay restores to interrupt, at the contacts 252, the multiple circuits for energizing the solenoids 104' and 201 of the respective odd return clutch 104 and the even return clutch, not shown; whereby the return shaft 99 is disconnected from the odd Geneva mechanism 88 and the even Geneva mechanism, not shown. Further, the finish relay R250, upon restoring, interrupts, at the contacts 254, the holding circuit for retaining energized the start solenoid 34 of the Hilliard mechanism 32; whereby upon the next complete revolution of the main shaft 23, further rotation of the main shaft 23 is arrested by virtue of the operation of the Hilliard mechanism 32, in the manner previously explained.

At this time, the operation of the apparatus 10 is complete, although the drive motor 25 is running idle; whereby the operator may return the master switch 225 back into its open position so as to arrest operation of the drive motor 25. Further, when the master switch 225 is thus opened, the circuit for supplying power to the reproducing amplifier 280 is interrupted arresting operation thereof. At this time the control circuit 200 occupies its normal rest position and the intelligence has been continuously reproduced from the record card 21 in the continuous section thereof involving lines 7 to 36, inclusive, as explained above.

In view of the foregoing description, it will be understood that by the simple manipulation of the recording and reproducing switch 226 the apparatus 10 may be selectively set either for recording or reproducing operations, and that by selective setting of the manual control knobs 208 and 213 the particular lines on the record card that are to be involved in either recording or the reproduction may be predetermined. This arrangement is very advantageous as its permits the recording at different times of intelligence upon predetermined groups of the lines on the record card 21, and it permits the reproduction at different times from only predetermined groups of the lines on the record card 21.

Considering now the speed of operation of the apparatus 10, it is noted that in the illustrated embodiment the translating speed of the heads 46 and 47 is 2.13" per second; whereby the time to translate a single line (either recording or reproducing) is 4.69 seconds; and the time to translate the entire forty lines on the record card 21 is 187.6 seconds. In the arrangement, the cylindrical cam 24 is rotated at 6.39 R. P. M.; and the time required to return the heads 46 and 47 and the carriages 44 and 45 back into their home positions after the translation of the fortieth line upon the record card 21 is 3.9 seconds. Thus it will be understood, that after the translation in either direction of one record card 21, another record card 21 may be substituted in the apparatus 10 after the short restoring time interval mentioned; whereby the other record card 21 mentioned may then be translated by the apparatus 10.

In view of the foregoing, it is apparent that there has been provided an improved apparatus for translating intelligence in either direction between an electric circuit and a magnetic record card involving combination recording and reproducing apparatus utilizing a magnetic record card that may be filed, when not in use, in a conventional record cabinet, or the like. In the arrangement, the apparatus comprises odd and even electromagnetic transducers and the record card carries odd and even groups of adjacent longitudinally extending and laterally spaced-apart elongated magnetic media. In accordance with the operation of the apparatus, the odd and even transducers are moved alternately longitudinally along and in cooperating relation with the magnetic media in the respective odd and even groups, and the odd and even transducers are alternately indexed laterally with respect to the individual magnetic media in the corresponding odd and even groups, and intermediate the alternate longitudinal movements thereof, and alternately the odd and even transducers are coupled to the associated electric circuit; whereby the translation of the intelligence in either direction between the electric circuit and a plurality of the magnetic media is continuous and involves sequentially the magnetic media in the odd and even groups. Further, in accordance with the operation of the apparatus, the particular lines carried by the magnetic record card that are to be involved in the translation may be preselected thereby rendering exceedingly flexible the translation of intelligence in either direction between the electric circuit and the particular lines of magnetic media noted carried by the record card.

While there has been described what is at present considered to be preferred embodiment of the invention, it will be understood that various modifications may be made therein, and it is intended to cover in the appended claims all such modifications as fall within the true spirit and scope of the invention.

What is claimed is:

1. In combination, a record card carrying odd and even groups of adjacent longitudinally extending and laterally spaced-apart elongated magnetic media; and translation apparatus comprising a platen supporting said record card, odd and even electromagnetic transducers respectively cooperating with said magnetic media in said respective odd and even groups, means for moving alternately said odd and even transducers longitudinally along and in cooperating relation with said magnetic media in said respective odd and even groups, means for indexing alternately said odd and even transducers laterally with respect to said individual magnetic media in said corresponding odd and even groups and intermediate said alternate longitudinal movements thereof, an electric circuit, and means for coupling alternately said odd and even transducers to said electric circuit, whereby intelligence may be translated between said electric circuit and a plurality of said magnetic media continuously and involving sequentially said magnetic media in said odd and even groups.

2. In combination, a record card carrying odd and even groups of adjacent longitudinally extending and laterally spaced-apart elongated magnetic media; and translation apparatus comprising a platen supporting said record card, odd and even electomagnetic transducers respectively cooperating with said magnetic media in said respective odd and even groups, means for advancing said odd transducer in a first longitudinal direction along and in cooperating relation with a first odd magnetic medium in said odd group and for simultaneously indexing said even transducer laterally with respect to a first even magnetic medium in said even group and returning said even transducer in a second longitudinal direction with respect to said even group, means then for advancing said even transducer in said first longitudinal direction along and in cooperating relation with said first even magnetic medium in said even group and for simultaneously indexing said odd transducer laterally with respect to a second odd magnetic medium in said odd group and returning said odd transducer in said second longitudinal direction with respect to said odd group, whereby said odd and even transducers are repeatedly cycled with respect to said respective odd and even groups, an electric circuit, and means for coupling alternately said odd and even transducers during the alternate advancements thereof to said electric circuit, whereby intelligence may be translated between said electric circuit and a plurality of said magnetic media continuously and involving sequentially said magnetic media in said odd and even groups.

3. The combination set forth in claim 2, wherein means are provided for defining the advancement of each of said transducers throughout at least 180° of its corresponding cycle, and wherein means are provided for defining the coupling of said odd and even transducers to said electric circuit during substantially supplementary 180° portions of the advancements thereof in the corresponding cycles thereof.

4. The combination set forth in claim 2, wherein means are provided for limiting the advancement of each of said transducers to a slower rate than the rate of return thereof.

5. Electromagnetic translation apparatus comprising a platen adapted to support a record card carrying odd and even groups of adjacent longitudinally extending and laterally spaced-apart elongated magnetic media, odd and even electromagnetic transducers respectively cooperating with said magnetic media in said respective odd and even groups, means for moving alternately said odd and even transducers longitudinally along and in cooperating relation with said magnetic media in said respective odd and even groups, means for indexing alternately said odd and even transducers laterally with respect to said individual magnetic media in said corresponding odd and even groups and intermediate said alternate longitudnal movements thereof, an electric circuit, and means for coupling alternately said odd and even transducers to said electric circuit, whereby intelligence may be translated between said electric circuit and a plurality of said magnetc media continuously and involving sequentially said magnetic media in said odd and even groups.

6. In combination magnetic recording and reproducing apparatus, a platen adapted to support a record card carrying odd and even groups of adjacent longitudinally extending and laterally spaced-apart elongated magnetic media, odd and even electromagnetic transducers respectively cooperating with said magnetic media in said respective odd and even groups, means for moving alternately said odd and even transducers longitudinally along and in cooperating relation with said magnetic media in said respective odd and even groups, means for indexing alternately said odd and even transducers laterally with respect to said individual magnetic media in said corresponding odd and even groups and intermediate said alternate longtudinal movements thereof, an electric circuit, and means for coupling alternately said odd and even transducers to said electric circuit, whereby intelligence may be translated in either direction between said electric circuit and a plurality of said magnetic media continuously and involving sequentially said magnetic media in said odd and even groups.

7. Electromagnetic translation apparatus comprising a platen adapted to support a record card carrying adjacent longitudinally extending and laterally spaced-apart elongated magnetic media, a transducer mounted adjacent to said platen, means for cyclically reciprocating said transducer to advance the same longitudinally along and in cooperating relation with one of said magnetic media and to thereafter return the same, and means for indexing said transducer laterally following each advancement thereof and into cooperating relation with the next adjacent one of said magnetic media, whereby intelligence may be translated between said transducer and a plurality of said magnetic media in sequence.

8. The electromagnetic translation apparatus set forth in claim 7, wherein means are provided for determining the longitudinal travel of said transducer as somewhat greater than the length of said magnetic media.

9. The electromagnetic translation apparatus set forth in claim 7, wherein means are included to maintain the rate of the advancement of said transducer along any one of said magnetic media at a substantially uniform velocity.

10. The electromagnetic translation apparatus set forth in claim 7, wherein means are included to provide that the longitudinal advancement of said transducer is at a rate slower than the longitudinal return thereof and wherein the longitudinal advancement of said transducer comprises more than 180° of the cycle of movement thereof.

11. Electromagnetic translation apparatus comprising a platen adapted to support a record card carrying adjacent longitudinally extending and laterally spaced-apart elongated magnetic media, a carriage mounted adjacent to said platen, means for indexing said carriage laterally step by step with respect to said platen, a slide mounted upon said carriage, means for reciprocating said slide longitudinally with respect to said carriage, a transducer carried by said slide and cooperating with said magnetic media, and means for cyclically correlating the indexing of said carriage and the reciprocation of said slide so that in each cycle said transducer is advanced longitudinally along and in cooperating relation with one of said magnetic media and is then indexed laterally and returned longitudinally into cooperating relation with the next adjacent one of said magnetic media, whereby intelligence may be translated between said transducer and a plurality of said magnetic media in sequence.

12. Electromagnetic translation apparatus comprising a platen adapted to support a record card carrying adjacent longitudinally extending and laterally spaced-apart elongated magnetic media, a carriage mounted adjacent to said platen, means for indexing said carriage laterally step by step with respect to said platen, a slide mounted upon said carriage, means for reciprocating said slide longitudinally with respect to said carriage, a transducer pivotally mounted upon said slide and cooperating with said magnetic media, means responsive to longitudinal movement of said slide in one direction to advance said transducer for pivoting said transducer with respect to said slide toward said magnetic media and responsive to longitudinal movement of said slide in the opposite direction to return said transducer for pivoting said transducers with respect to said slide away from said magnetic media, and means for cyclically correlating the indexing of said carriage and the reciprocation of said slide so that said transducer in each cycle is advanced longitudinally along and in cooperating relation with one of said magnetic media and is then indexed laterally and returned longitudinally into cooperating relation with the next adjacent one of said magnetic media, whereby intelligence may be translated between said transducer and a plurality of said magnetic media in sequence.

13. Electromagnetic translation apparatus comprising a platen adapted to support a record card carrying odd and even groups of adjacent longitudinally extending and laterally spaced-apart magnetic media, odd and even transducers mounted adjacent to said platen, first means for cyclically moving said odd transducer so that it is advanced longitudinally along and in cooperating relation with a first odd magnetic medium in said odd group and is then indexed laterally and returned longitudinally into cooperating relation with a second odd magnetic medium in said odd group, second means for cyclically moving said even transducer so that it is advanced longitudinally along and in cooperating relation with a first even magnetic medium in said even group and is then indexed laterally and returned longitudinally into cooperating relation with a second even magnetic medium in said even group, first cyclic mechanism for correlating said first and second means so that said odd and even transducers are alternately advanced in their respective cycles of movements, an electric circuit, and second cyclic mechanism for alternately coupling said odd and even transducers to said electric circuit during the respective and corresponding advancements of said odd and even transducers in their respective cycles of movements.

14. The electromagnetic translation apparatus set forth in claim 13, wherein said first and second means for cyclically moving said respective odd and even transducers respectively include first and second cam followers, and said first cyclic mechanism includes a cam commonly cooperating with said first and second cam followers.

15. The electromagnetic translation apparatus set forth in claim 13, wherein said first cyclic mechanism includes a rotatable camshaft, and said second cyclic mechanism includes a switching device controlled by said camshaft.

16. The electromagnetic translation apparatus set forth in claim 13, wherein means are provided for terminating the longitudinal travel of each of said transducers in each longitudinal direction at points separated by a distance greater than the length of said magnetic media and wherein the coupling of said electric circuit to each of said transducers is within the longitudinal advancement thereof in its cycle of movements, whereby the translation of intelligence between said electric circuit and a plurality of said magnetic media is continuous and involves sequentially said magnetic media in said odd and even groups.

17. The electromagnetic translation apparatus set forth in claim 13, and further comprising means for restoring laterally back into their start positions said odd and even transducers.

18. The electromagnetic translation apparatus set forth in claim 17, wherein said last-mentioned means includes means to restore simultaneously said odd and even transducers.

19. The electromagnetic translation apparatus set forth in claim 13, and further comprising a continuous electric signal source, and a switch for selectively connecting and disconnecting said signal source with respect to said electric circuit, whereby any continuous portion of the continuous signal from said source may be magnetically recorded upon a plurality of said magnetic media.

20. The electromagnetic translation apparatus set forth in claim 13, and further comprising a continuous electric signal source, a switch operative between closed and open positions respectively connecting and disconnecting said signal source with respect to said electric circuit, first control means governed by the cyclic movement of one of said transducers for operating said switch into its closed position to initiate magnetic recording upon the corresponding one of the magnetic media in the corresponding one group, and second control means for operating said switch into its open position to arrest magnetic recording upon said magnetic media.

21. The electromagnetic translation apparatus set forth in claim 20, wherein said first control means includes a manually settable device for selectively predetermining the particular corresponding one of the magnetic media in the corresponding one group upon which magnetic recording is to be initiated.

22. The electromagnetic translation apparatus set forth in claim 13, and further comprising a continuous electric signal source, a switch operative between closed and open positions respectively connecting and disconnecting said signal source with respect to said electric circuit, first control means for operating said switch into its closed position to initiate magnetic recording upon said magnetic media, and second control means governed by the cyclic movement of one of said transducers for operating said switch into its open position to arrest magnetic recording upon the corresponding one of the magnetic media in the corresponding one group.

23. The electromagnetic translation apparatus set forth in claim 22, wherein said second control means includes a manually settable device for selectively predetermining the corresponding one of the magnetic media in the corresponding one group upon which magnetic recording is to be arrested.

24. The electromagnetic translation apparatus set forth in claim 13, and further comprising a continuous electric signal source, a switch operative between closed and open positions respectively connecting and disconnecting said signal source with respect to said electric circuit, first control means governed by the cyclic movement of one of said transducers for operating said switch into its closed position to initiate magnetic recording upon the corresponding one of the magnetic media in the corresponding one group, and second control means governed by the cyclic movement of the other of said transducers for operating said switch into its open position to arrest magnetic recording upon the corresponding other of the magnetic media in the corresponding other group.

25. The electromagnetic translation apparatus set forth in claim 13, and further comprising a continuous electric signal source, a switch operative between closed and open positions respectively connecting and disconnecting said signal source with respect to said electric circuit, first control means governed by the cyclic movement of one of said transducers for operating said switch into its closed position to initiate magnetic recording upon the corresponding one of the magnetic media in the corresponding one group, said first control means including a first manually settable device for selectively predetermining the particular corresponding one of the magnetic media in the corresponding one group upon which magnetic recording is to be initiated, and second control means governed by the cyclic movement of the other of said transducers for operating said switch into its open position to arrest magnetic recording upon the corresponding other of the magnetic media in the corresponding other group, said second control means including a second manually settable device for selectively predetermining the particular corresponding other of the magnetic media in the corresponding other group upon which magnetic recording is to be arrested.

26. The electromagnetic translation apparatus set forth in claim 13, wherein said magnetic media in said odd and even groups have magnetically recorded thereon alternately continuous intelligence, and further comprising a signal reproduction unit, and a switch for selectively connecting and disconnecting said electric circuit with respect to said unit, whereby any continuous segment of the continuous intelligence magnetically recorded upon said magnetic media may be reproduced by said unit.

27. The electromagnetic translation apparatus set forth in claim 13, wherein said magnetic media in said odd and even groups have magnetically recorded thereon alternately continuous intelligence, and further comprising a signal reproduction unit, a switch operative between closed and open positions respectively connecting and disconnecting said electric circuit with respect to said unit, first control means governed by the cyclic movement of one of said transducers for operating said switch into its closed position to initiate signal reproduction by said unit of the magnetic recording upon the corresponding one of the magnetic media in the corresponding one group, and second control means for operating said switch into its open position to arrest signal reproduction by said unit.

28. The electromagnetic translation apparatus set forth in claim 27, wherein said first control means includes a selectively predetermining the particular corresponding one of the magnetic media in the corresponding one group upon which signal reproduction by said unit is to be initiated.

29. The electromagnetic translation apparatus set forth in claim 13, wherein said magnetic media in said odd and even groups have magnetically recorded thereon alternately continuous intelligence, and further comprising a signal reproduction unit, a switch operative between closed and open positions respectively connecting and disconnecting said electric circuit with respect to said unit, first control means for operating said switch into its closed position to initiate signal reproduction by said unit, and second control means governed by the cyclic movement of one of said transducers for operating said switch into its open position to arrest signal reproduction by said unit upon the corresponding one of the magnetic media in the corresponding one group.

30. The electromagnetic translation apparatus set forth in claim 29, wherein said second control means includes a manually settable device for selectively predetermining the corresponding one of the magnetic media in the corresponding one group upon which signal reproduction by said unit is to be arrested.

31. The electromagnetic translation apparatus set forth in claim 13, wherein said magnetic media in said odd and even groups have magnetically recorded thereon alternately continuous intelligence, and further comprising a signal reproduction unit, a switch operative between closed and open positions respectively connecting and disconnecting said electric circuit with respect to said unit, first control means governed by the cyclic movement of one of said transducers for operating said switch into its closed position to initiate signal reproduction by said unit of the magnetic recording upon the corresponding one of the magnetic media in the corresponding one group, and second control means governed by the cyclic movement of the other of said transducers for operating said switch into its open position to arrest signal reproduction by said unit upon the corresponding other of the magnetic media in the corresponding other group.

32. The electromagnetic translation apparatus set forth in claim 13, wherein said magnetic media in said odd and even groups have magnetically recorded thereon alternately continuous intelligence, and further comprising a signal reproduction unit, a switch operative between closed and open positions respectively connecting and disconnecting said electric circuit with respect to said unit, first control means governed by the cyclic movement of one of said transducers for operating said switch into its closed position to initiate signal reproduction by said unit of the magnetic recording upon the corresponding one of the magnetic media in the corresponding one group, said first control means including a first manually settable device for selectively predetermining the particular corresponding one of the magnetic media in the corresponding one group upon which signal reproduction by said unit is to be initiated, and second control means governed by the cyclic movement of the other of said transducers for operating said switch into its open position to arrest signal reproduction by said unit upon the corresponding other of the magnetic media in the corresponding other group, said second control means including a second manually settable device for selectively predetermining the corresponding other of the magnetic media in the corresponding other group upon which signal reproduction by said unit is to be arrested.

References Cited in the file of this patent

UNITED STATES PATENTS

| | | |
|---|---|---|
| 2,254,933 | Bryce | Sept. 2, 1941 |
| 2,603,006 | MacChesney et al. | July 15, 1952 |
| 2,650,830 | Potter | Sept. 1, 1953 |
| 2,685,409 | English et al. | Aug. 3, 1954 |
| 2,694,110 | Roberts | Nov. 9, 1954 |
| 2,722,676 | Begun | Nov. 1, 1955 |